US 12,338,860 B2

(12) United States Patent
Iino et al.

(10) Patent No.: US 12,338,860 B2
(45) Date of Patent: Jun. 24, 2025

(54) ROLLING BEARING, ROTATING DEVICE, AND METHOD FOR MANUFACTURING ROLLING BEARING

(71) Applicant: Seiko Instruments Inc., Chiba (JP)

(72) Inventors: Akihiro Iino, Chiba (JP); Takayuki Kosaka, Chiba (JP); Haruhiko Hasegawa, Chiba (JP); Daisuke Kobayashi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 116 days.

(21) Appl. No.: 18/074,248

(22) Filed: Dec. 2, 2022

(65) Prior Publication Data

US 2023/0184289 A1 Jun. 15, 2023

(30) Foreign Application Priority Data

Dec. 15, 2021 (JP) ................... 2021-203237

(51) Int. Cl.
*F16C 33/66* (2006.01)
*F16C 19/16* (2006.01)
(Continued)

(52) U.S. Cl.
CPC .......... *F16C 33/6614* (2013.01); *F16C 19/16* (2013.01); *F16C 33/6607* (2013.01);
(Continued)

(58) Field of Classification Search
CPC .......... F16C 19/06; F16C 19/16; F16C 33/66; F16C 33/6603; F16C 33/6607;
(Continued)

(56) References Cited

U.S. PATENT DOCUMENTS

2003/0015262 A1* 1/2003 Takemura ............... F16C 33/62
148/663

FOREIGN PATENT DOCUMENTS

JP 2017-150615 A 8/2017
WO WO-2021060232 A1 * 4/2021 .......... C10M 115/08

OTHER PUBLICATIONS

Machine Translation of WO 2021060232 (Year: 2021).*

* cited by examiner

*Primary Examiner* — Alan B Waits
(74) *Attorney, Agent, or Firm* — Crowell & Moring LLP (57) ABSTRACT

Provided is a rolling bearing that can both ensure durability and reduce rotational resistance. The rolling bearing includes a seal member that is mounted on an outer ring and that covers a space between an inner ring and the outer ring from an outer side in an axial direction, and grease disposed between a rolling element and the seal member. The seal member includes an annular pedestal portion in contact with the outer ring from an outer side in the axial direction, an extending portion that extends outward in the axial direction from an inner peripheral edge of the pedestal portion, and a flat surface portion that extends along a radial direction from an end edge of the extending portion on an outer side in the axial direction toward the inner ring. The grease includes an outer ring contact portion in contact with an inner peripheral surface of the outer ring, and a seal member contact portion in contact with the flat surface portion on an outer side in the axial direction and an inner ring side with respect to the outer ring contact portion. An area of the seal member contact portion is larger than a contact area between the grease and the extending portion as well as the pedestal portion of the seal member.

7 Claims, 3 Drawing Sheets

(51) Int. Cl.
*F16C 33/78* (2006.01)
*F16C 33/80* (2006.01)
*F16C 43/04* (2006.01)

(52) U.S. Cl.
CPC .............. *F16C 33/78* (2013.01); *F16C 33/80* (2013.01); *F16C 43/045* (2013.01)

(58) Field of Classification Search
CPC .............. F16C 33/6614; F16C 33/6618; F16N 2210/14; C10N 2040/02
See application file for complete search history.

ROLLING BEARING, ROTATING DEVICE, AND METHOD FOR MANUFACTURING ROLLING BEARING

RELATED APPLICATIONS

This application claims priority to Japanese Patent Application No. 2021-203237, filed on Dec. 15, 2021, the entire content of which is incorporated herein by reference.

BACKGROUND OF THE INVENTION

1. Field of the Invention

The present invention relates to a rolling bearing, a rotating device, and a method for manufacturing the rolling bearing.

2. Description of the Related Art

In the related art, there is a rolling bearing in which grease is held between a pair of raceway rings (an inner ring and an outer ring). In this type of rolling bearing, resistance of the grease may be a factor that increases rotational resistance. Incidentally, in a rolling bearing, a reduction in the rotational resistance is desired for the purpose of power-saving of a mounted rotating device. Particularly, in a small rolling bearing used in various motors such as a fan motor, there is a strong demand for reduction in the rotational resistance.

In order to reduce the rotational resistance of the rolling bearing, it is effective to dispose grease such that the grease does not come into contact with both members that rotate relative to each other. Therefore, the grease is applied to an end portion of a fixed ring (the outer ring in many cases) of the rolling bearing in an axial direction or a seal member disposed on an end portion side to reduce an amount of grease that comes into contact with rolling elements (balls) and a cage that holds the rolling elements (for example, see JP-A-2017-150615). In a rolling bearing described in JP-A-2017-150615, grease adheres to an inner peripheral surface of an outer ring avoiding a raceway surface in contact with rolling elements, and is filled in a circular ring shape and biased toward an inner peripheral surface side of an outer ring such that the grease does not come into contact with an outer peripheral surface of an inner ring.

However, when the amount of the grease is reduced in order to reduce the rotational resistance, life of the rolling bearing may be reduced due to lack of the grease. Therefore, the related-art rolling bearing has an object of both ensuring the durability and reducing the rotational resistance.

SUMMARY OF THE INVENTION

Therefore, the present invention provides a rolling bearing, a rotating device, and a method for manufacturing the rolling bearing, which can both ensure durability and reduce rotational resistance.

According to a first aspect of the invention, there is provided a rolling bearing including: an inner ring and an outer ring arranged coaxially with each other; a rolling element disposed between the inner ring and the outer ring; a seal member that is mounted on one raceway ring of the inner ring and the outer ring and that covers a space between the inner ring and the outer ring from an outer side in an axial direction; and grease disposed between the rolling element and the seal member. The seal member includes an annular pedestal portion in contact with the one raceway ring from an outer side in the axial direction, an extending portion that extends outward in the axial direction from a peripheral edge of the pedestal portion on the other raceway ring side of the inner ring and the outer ring, and a flat surface portion that extends along a radial direction from an end edge of the extending portion on an outer side in the axial direction toward the other raceway ring. The grease includes a raceway ring contact portion in contact with a peripheral surface of the one raceway ring, the peripheral surface facing the other raceway ring, and a seal member contact portion in contact with the flat surface portion on an outer side in the axial direction and the other raceway ring side with respect to the raceway ring contact portion. An area of the seal member contact portion is larger than a contact area between the grease and the extending portion as well as the pedestal portion of the seal member.

According to the present invention, when the seal member is mounted after the grease is applied to a predetermined location, it is possible to provide a room for the grease pressed inward in the axial direction by the flat surface portion of the seal member to spread in a radial direction toward the extending portion and the pedestal portion. Therefore, it is possible to prevent the grease from greatly spreading to the other raceway ring side and a rolling element side. Therefore, it is possible to easily prevent the grease from being in direct contact with the rolling element and the other raceway ring.

Further, since the extending portion is provided between the flat surface portion and the pedestal portion, as compared with a configuration in which a flat surface portion extends toward the other raceway ring side from a pedestal portion, the grease can be disposed at a position further separated from the rolling element. Therefore, an amount of the grease can be increased.

As described above, it is possible to provide a rolling bearing that can both ensure durability and reduce rotational resistance.

According to a second aspect of the invention, in the rolling bearing of the first aspect, the seal member contact portion may include a center position of the grease in the radial direction when viewed from the axial direction.

According to the present invention, when the seal member is mounted, the grease spreads in the radial direction by being pressed by the flat surface portion. As a result, the seal member contact portion includes the center position of the grease in the radial direction when viewed from the axial direction, so that it is possible to prevent the grease from greatly spreading inward in the axial direction toward the rolling element. Therefore, it is possible to easily prevent the grease from being in direct contact with the rolling element.

According to a third aspect of the invention, in the rolling bearing of the first or second aspect, the grease may not be in contact with the extending portion.

According to the present invention, when the seal member is mounted, it is possible to provide a larger room for the grease pressed inward in the axial direction by the flat surface portion of the seal member to spread in the radial direction toward the extending portion. Therefore, it is possible to prevent the grease from greatly spreading to the other raceway ring side and the rolling element side. Therefore, it is possible to easily prevent the grease from being in direct contact with the rolling element and the other raceway ring.

According to a fourth aspect of the invention, in the rolling bearing of the first, second, or third aspect, the raceway ring contact portion may be provided at an interval in the axial direction from a contact portion between the one raceway ring and the pedestal portion.

According to the present invention, it is possible to prevent the grease from coming into contact with a contact portion between the one raceway ring and the pedestal portion. Accordingly, it is possible to prevent the grease from leaking to an outer side of the seal member due to a capillary phenomenon through the contact portion between the one raceway ring and the pedestal portion.

According to a fifth aspect of the invention, in the rolling bearing of any one of the first to fourth aspect, the grease may not be in contact with the pedestal portion.

According to the present invention, it is possible to prevent the grease from coming into contact with the contact portion between the one raceway ring and the pedestal portion. Accordingly, it is possible to prevent the grease from leaking to the outer side of the seal member due to the capillary phenomenon through the contact portion between the one raceway ring and the pedestal portion.

According to a sixth aspect of the invention, in the rolling bearing of any one of the first to fifth aspect, the one raceway ring may include a protruding portion that protrudes toward the other raceway ring side and on which a raceway surface is formed, the protruding portion may include an end surface that faces an outer side in the axial direction, that is connected to the peripheral surface at a peripheral edge on the other raceway ring side, and that is in contact with the pedestal portion, and the pedestal portion may not protrude toward the other raceway ring side with respect to the end surface when viewed from the axial direction.

According to the present invention, even if the raceway ring contact portion of the grease spreads outward in the axial direction and climbs over a peripheral edge of the end surface, the grease is unlikely to adhere to the pedestal portion. Therefore, it is possible to prevent the grease from coming into contact with the contact portion between the one raceway ring and the pedestal portion. Accordingly, it is possible to prevent the grease from leaking to the outer side of the seal member due to the capillary phenomenon through the contact portion between the one raceway ring and the pedestal portion.

According to a seventh aspect of the invention, there is provided a rotating device including: a rotatably disposed rotating body; a support body configured to rotatably support the rotating body; and the rolling bearing described above interposed between the rotating body and the support body.

According to the present invention, since the rolling bearing that both ensures the durability and reduces the rotational resistance is provided, it is possible to achieve a long life of the rotating device and power-saving of the rotating device because of the reduction in the rotational resistance of the rotating body with respect to the support body.

In a method for manufacturing a rolling bearing according to the present invention, the rolling bearing includes an inner ring and an outer ring arranged coaxially with each other, a rolling element disposed between the inner ring and the outer ring, a seal member that is mounted on one raceway ring of the inner ring and the outer ring and that covers a space between the inner ring and the outer ring from an outer side in an axial direction; and grease disposed between the rolling element and the seal member. The seal member includes an annular pedestal portion in contact with the one raceway ring from an outer side in the axial direction, an extending portion that extends outward in the axial direction from a peripheral edge of the pedestal portion on the other raceway ring side of the inner ring and the outer ring, and a flat surface portion that extends along a radial direction from an end edge of the extending portion on an outer side in the axial direction toward the other raceway ring. The method for manufacturing a rolling bearing includes: an application step of bringing the grease into contact with the one raceway ring, and applying the grease such that the grease protrudes outward in the axial direction and toward the other raceway ring side from a contact portion with the one raceway ring; a contact step of bringing the seal member close to the one raceway ring from an outer side in the axial direction and bringing the flat surface portion into contact with an end edge of the grease on an outer side in the axial direction; and a mounting step of, after the contact step, bringing the seal member close to the one raceway ring, bringing the pedestal portion into contact with the one raceway ring from an outer side in the axial direction, and pressing the grease inward in the axial direction by the flat surface portion.

According to the present invention, since the flat surface portion of the seal member is in contact with an end edge of the grease on an outer side in the axial direction in the contact step, in a process of pressing the grease inward in the axial direction by the flat surface portion in the mounting step, it is possible to provide a room for the grease to spread in the radial direction toward the extending portion and the pedestal portion of the seal member. Therefore, it is possible to prevent the grease from greatly spreading to the other raceway ring side and the rolling element side. Therefore, it is possible to easily prevent the grease from being in direct contact with the rolling element and the other raceway ring.

Further, since the extending portion is provided between the flat surface portion and the pedestal portion, as compared with a configuration in which a flat surface portion extends toward the other raceway ring side from a pedestal portion, the grease is unlikely to be pressed toward a rolling element side. Therefore, since the grease can be disposed in advance at a position closer to the rolling element, the amount of the grease can be increased.

As described above, it is possible to manufacture a rolling bearing that can both ensure the durability and reduce the rotational resistance.

According to the present invention, it is possible to provide a rolling bearing, a rotating device, and a method for manufacturing the rolling bearing, which can both ensure durability and reduce rotational resistance.

DETAILED DESCRIPTION OF THE PREFERRED EMBODIMENTS

Hereinafter, embodiments of the present invention will be described with reference to the drawings. In the following description, configurations having the same or similar functions are denoted by the same reference numerals. Repeated description of these configurations may be omitted.

First Embodiment

A first embodiment according to the present invention will be described with reference to FIGS. 1 to 4.

Figure 1:
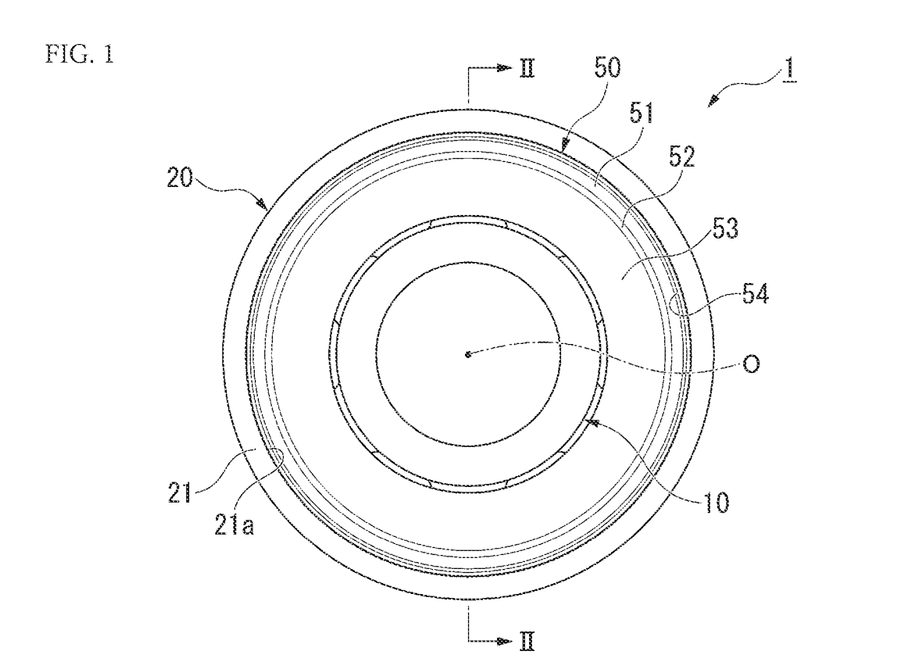
FIG. 1 is a plan view of a rolling bearing according to a first embodiment.
Figure 2:
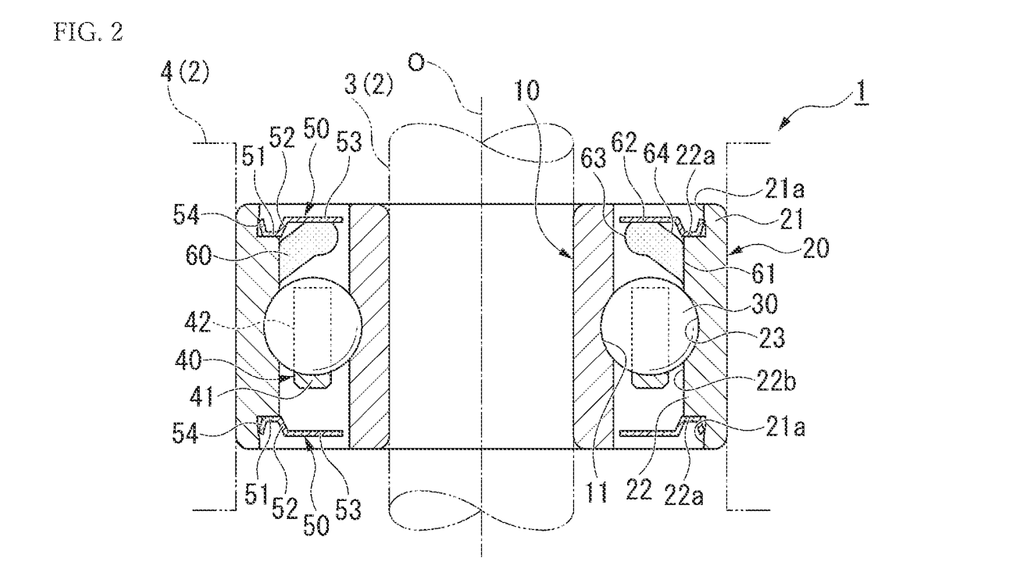
FIG. 2 is a cross-sectional view taken along a line II-II in FIG. 1.

FIG. 1 is a plan view of a rolling bearing according to the first embodiment. FIG. 2 is a cross-sectional view taken along a line II-II in FIG. 1. In FIG. 2, a rotating device 2 mounted with a rolling bearing 1 is indicated by imaginary lines.

As shown in FIGS. 1 and 2, the rolling bearing 1 is a ball bearing including an inner ring 10 and an outer ring 20 that are raceway rings, a plurality of rolling elements 30, a cage 40, a pair of seal members 50, and grease 60. The rolling bearing 1 is provided in the rotating device 2 such as a fan motor. The rotating device 2 includes a shaft 3 (rotating body) rotatable around a common axis O, and a housing 4 (support body) that is fixedly disposed and that rotatably supports the shaft 3. The rolling bearing 1 is interposed between the shaft 3 and the housing 4. Hereinafter, the rolling bearing may be simply referred to as a bearing.

The inner ring 10 and the outer ring 20 are arranged coaxially with each other such that central axes of the inner ring 10 and the outer ring 20 coincide with the common axis O. In the present embodiment, a direction in which the common axis O extends is referred to as an axial direction, a direction that is orthogonal to the common axis O and that radially extends from the common axis O is referred to as a radial direction, and a direction circling around the common axis O is referred to as a circumferential direction. Further, between directions parallel to the axial direction and oriented in directions opposite to each other, one is defined as an upper side, and the other is defined as a lower side.

The inner ring 10 is provided as a rotating ring. The inner ring 10 is externally fitted to the shaft 3 and is fixed to the shaft 3. The outer ring 20 is provided as a fixed ring. The outer ring 20 is fitted into a recess (or a through hole) of the housing 4 and is fixed to the housing 4. The outer ring 20 surrounds the inner ring 10 from an outer side in the radial direction in a state in which an annular space is formed between the outer ring 20 and the inner ring 10. The plurality of rolling elements 30 are arranged between the inner ring 10 and the outer ring 20, and are held by the cage 40 in a rollable manner. The cage 40 rotatably holds the rolling elements 30 in a state in which the plurality of rolling elements 30 are evenly arranged in the circumferential direction. The seal members 50 are mounted on the outer ring 20, and cover the annular space between the inner ring 10 and the outer ring 20 from an outer side in the axial direction.

The outer ring 20 is formed of a metal material such as stainless steel or bearing steel in a circular ring shape. However, the outer ring 20 is not limited to being formed of metal, and may be formed of other materials. The outer ring 20 includes an outer ring main body 21 having a width along the axial direction equal to a width along an axial direction of the inner ring 10, and a protruding portion 22 that protrudes inward in the radial direction from the outer ring main body 21 and that extends in the entire circumferential direction. The protruding portion 22 is formed at a portion of the outer ring main body 21 located at a center in the axial direction. A width of the protruding portion 22 along the axial direction is smaller than a width of the outer ring main body 21 along the axial direction, and is larger than an outer diameter of the rolling element 30.

The protruding portion 22 includes a pair of end surfaces 22a facing outward in the axial direction, and an inner peripheral surface 22b that connects inner peripheral edges of the pair of end surfaces 22a. The end surfaces 22a extend in parallel in both the radial direction and the circumferential direction. An outer ring raceway surface 23 recessed outward in the radial direction is formed on the inner peripheral surface 22b. The outer ring raceway surface 23 is formed in a hemispherical shape in a cross-sectional view along outer surfaces of the rolling elements 30, and is formed in an annular shape that extends in the circumferential direction over an entire periphery of the inner peripheral surface 22b. The outer ring raceway surface 23 is formed in a portion of the inner peripheral surface 22b located at a center in the axial direction. A portion of the inner peripheral surface 22b excluding the outer ring raceway surface 23 extends in the axial direction with a constant inner diameter.

The outer ring main body 21 has a pair of inner peripheral surfaces 21a that extend from outer peripheral edges of the end surfaces 22a of the protruding portion 22 to an opening edge of the outer ring 20. A portion of each inner peripheral surface 21a located inward in the axial direction is located outward in the radial direction with respect to a portion of each inner peripheral surface 21a located outward in the axial direction.

The inner ring 10 is formed of a metal material such as stainless steel or bearing steel in a circular ring shape. However, the inner ring 10 is not limited to being formed of metal, and may be formed of other materials. An inner ring raceway surface 11 recessed inward in the radial direction is formed on an outer peripheral surface of the inner ring 10. The inner ring raceway surface 11 is formed in a hemispherical shape in a cross-sectional view along the outer surfaces of the rolling elements 30, and is formed in an annular shape that extends in the circumferential direction over an entire periphery of an outer peripheral surface. The inner ring raceway surface 11 is formed in a portion of the outer peripheral surface of the inner ring 10 located at a center in the axial direction, and faces the outer ring raceway surface 23 in the radial direction. A portion of the outer peripheral surface of the inner ring 10 excluding the inner ring raceway surface 11 extends in the axial direction with a constant outer diameter.

As shown in FIG. 2, the plurality of rolling elements 30 are formed of a metal material such as stainless steel or bearing steel in a spherical shape. The plurality of rolling elements 30 are disposed between the outer ring raceway surface 23 and the inner ring raceway surface 11, and are supported by the outer ring raceway surface 23 and the inner ring raceway surface 11 in a rollable manner. The plurality of rolling elements 30 are held at intervals in the circumferential direction by the cage 40.

The cage 40 is formed of a synthetic resin or a metal material in a circular ring shape as a whole. The cage 40 is disposed around the common axis O. The cage 40 includes an annular portion 41 formed in a circular ring shape and disposed below the plurality of rolling elements 30, and a plurality of column portions 42 that protrude upward from the annular portion 41 and that are provided at intervals in the circumferential direction. The column portions 42 are arranged evenly in the circumferential direction. A pair of column portions 42 adjacent to each other in the circumferential direction form a ball pocket therebetween. The ball pocket penetrates through the cage 40 in the radial direction, and is open upward in an upper end surface of the cage 40. The ball pockets are provided corresponding to the number of the rolling elements 30, and hold the rolling elements 30 individually in a rollable manner. Accordingly, the cage 40 evenly arranges the rolling elements 30 at intervals in the circumferential direction. The cage 40 is disposed with a gap from the inner ring 10 and the outer ring 20 so as not to interfere with the inner ring 10 and the outer ring 20. In the present embodiment, the entire cage 40 is located inward in the axial direction with respect to the pair of end surfaces 22a of the protruding portion 22 of the outer ring 20.

As shown in FIGS. 1 and 2, the seal member 50 is formed in a circular-ring-shaped plate shape. The seal member 50 is disposed around the common axis O. The seal member 50 is formed uniformly over an entire periphery. The seal member 50 is fitted into the outer ring 20 from an outer side in the axial direction. The seal members 50 are arranged one by one on both sides in the axial direction with respect to the plurality of rolling elements 30. The seal member 50 includes an annular pedestal portion 51 in contact with the outer ring 20 from an outer side in the axial direction, an extending portion 52 that extends outward in the axial direction from an inner peripheral edge of the pedestal portion 51, a flat surface portion 53 that extends along the radial direction from an end edge of the extending portion 52 on an outer side in the axial direction toward the inner ring 10, and a locking portion 54 that extends outward in the radial direction and outward in the axial direction from an outer peripheral edge of the pedestal portion 51.

As shown in FIG. 2, the pedestal portion 51 overlaps the end surface 22a of the protruding portion 22 of the outer ring 20 from an outer side in the axial direction. The pedestal portion 51 extends substantially parallel to the end surface 22a of the protruding portion 22 of the outer ring 20. The pedestal portion 51 protrudes inward in the radial direction with respect to the end surface 22a of the protruding portion 22 in a plan view when viewed from the axial direction. A distance by which the pedestal portion 51 protrudes inward in the radial direction from the end surface 22a of the protruding portion 22 is 10% or less of an interval in the radial direction between the inner ring 10 and the outer ring 20, and is preferably 5% or less of the interval between the inner ring 10 and the outer ring 20 in the radial direction. The extending portion 52 extends outward in the axial direction and inward in the radial direction from the inner peripheral edge of the pedestal portion 51. The flat surface portion 53 overlaps centers of the rolling elements 30 in a plan view. An inner peripheral edge of the flat surface portion 53 is disposed on the outer peripheral surface of the inner ring 10 with a gap therebetween. A surface of the flat surface portion 53 facing inward in the axial direction is a flat surface that extends in the circumferential direction and the radial direction. An outer peripheral edge of the locking portion 54 is locked to the inner peripheral surface 21a of the outer ring main body 21 from an inner side in the axial direction. Accordingly, the seal member 50 is fixed to the outer ring 20.

The grease 60 is disposed between the rolling element 30 and the seal member 50. The grease 60 is disposed only on one side of the annular space between the inner ring 10 and the outer ring 20 in the axial direction with respect to the rolling element 30. In the present embodiment, the grease 60 is disposed on a side opposite to the annular portion 41 of the cage 40 with the rolling element 30 being sandwiched therebetween in the axial direction. That is, the grease 60 is disposed above the rolling elements 30. The grease 60 extends in a circular ring shape or an arc shape, and is disposed coaxially with the common axis O.

The grease 60 includes an outer ring contact portion 61 (raceway ring contact portion) in contact with the inner peripheral surface 22b of the protruding portion 22 of the outer ring 20, and a seal member contact portion 62 in contact with the flat surface portion 53 of the seal member 50 on an outer side in the axial direction and an inner side in the radial direction with respect to the outer ring contact portion 61. The outer ring contact portion 61 and the seal member contact portion 62 extend in the circumferential direction over an entire length of the grease 60. The outer ring contact portion 61 has a width in the axial direction over the entire circumferential direction. The outer ring contact portion 61 is in contact with a location of the inner peripheral surface 22b of the protruding portion 22 at an interval in the axial direction from the outer ring raceway surface 23. The outer ring contact portion 61 is in contact with a location of the inner peripheral surface 22b of the protruding portion 22 at an interval in the axial direction from the inner peripheral edge of the end surface 22a on an upper side. That is, the outer ring contact portion 61 is provided at an interval in the axial direction from a contact portion between the outer ring 20 and the pedestal portion 51 of the seal member 50. The seal member contact portion 62 has a width in the radial direction over the entire circumferential direction. The seal member contact portion 62 is in contact with the flat surface portion 53 at a location at an interval in the radial direction from a connection portion between the extending portion 52 and the flat surface portion 53 of the seal member 50.

The grease 60 extends outward in the axial direction and inward in the radial direction from the outer ring contact portion 61 toward the seal member contact portion 62. The grease 60 includes an inner surface 63 and an outer surface 64.

The inner surface 63 connects an end edge of the outer ring contact portion 61 on an inner side in the axial direction and an end edge of the seal member contact portion 62 on an inner side in the radial direction. The inner surface 63 faces the outer peripheral surface of the inner ring 10 and the rolling element 30. An upper half portion of the inner surface 63 extends inward in the axial direction and inward in the radial direction from an end edge of the seal member contact portion 62 on an inner side in the radial direction. A lower half portion of the inner surface 63 extends outward in the axial direction and inward in the radial direction from an end edge of the outer ring contact portion 61 on an inner side in the axial direction, and is connected to a lower end edge of the upper half portion. A boundary portion between the upper half portion and the lower half portion of the inner surface 63 forms an inner peripheral edge of the grease 60 located on an innermost side in the radial direction. The inner surface 63 is separated from the inner ring 10, the rolling elements 30, and the cage 40. Accordingly, the grease 60 is not in contact with the inner ring 10, the rolling elements 30, and the cage 40.

The outer surface 64 connects an end edge of the outer ring contact portion 61 on an outer side in the axial direction and an end edge of the seal member contact portion 62 on an outer side in the radial direction. The outer surface 64 faces the inner peripheral surface 22b of the protruding portion 22 of the outer ring 20 and the seal member 50. The outer surface 64 extends inward in the axial direction and outward in the radial direction from an end edge of the seal member contact portion 62 on an outer side in the radial direction, and is connected to an end edge of the outer ring contact portion 61 on an outer side in the axial direction. The outer surface 64 is separated from the pedestal portion 51 and the extending portion 52 of the seal member 50. Accordingly, the grease 60 is not in contact with the pedestal portion 51 and the extending portion 52 of the seal member 50, which are located closer to an outer ring 20 side than is the flat surface portion 53 of the seal member 50.

The grease 60 disposed as described above is formed such that a cross-sectional area orthogonal to the common axis O gradually increases from an end portion on an outer side in the axial direction toward an inner side in the axial direction. In the present embodiment, the grease 60 is formed such that the cross-sectional area orthogonal to the common axis O gradually increases from the end portion on an outer side in the axial direction toward an inner side in the axial direction at a portion corresponding to the upper half portion of the inner surface 63.

Next, a method for manufacturing the rolling bearing 1 according to the present embodiment will be described.

The method for manufacturing the rolling bearing 1 according to the present embodiment includes an application step and a sealing step.

Figure 3:
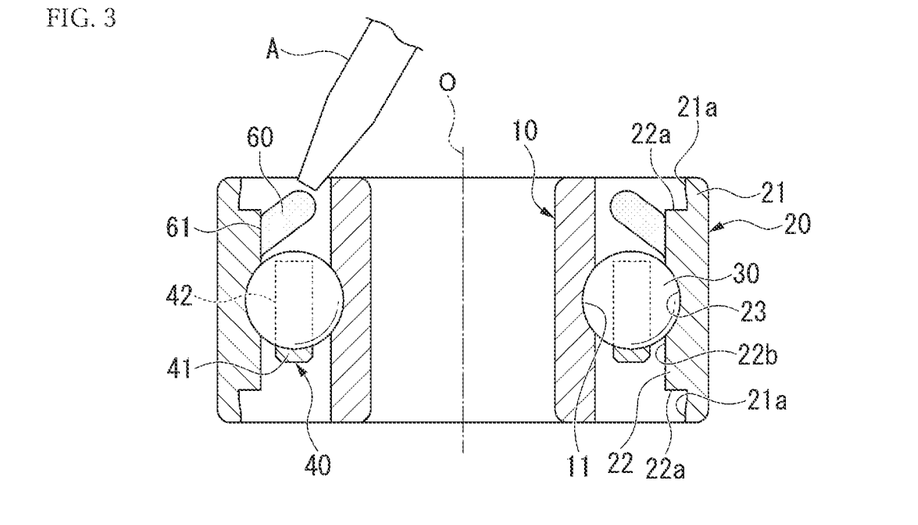
FIG. 3 is a longitudinal cross-sectional view of the rolling bearing illustrating a method for applying grease according to the first embodiment.
Figure 4:
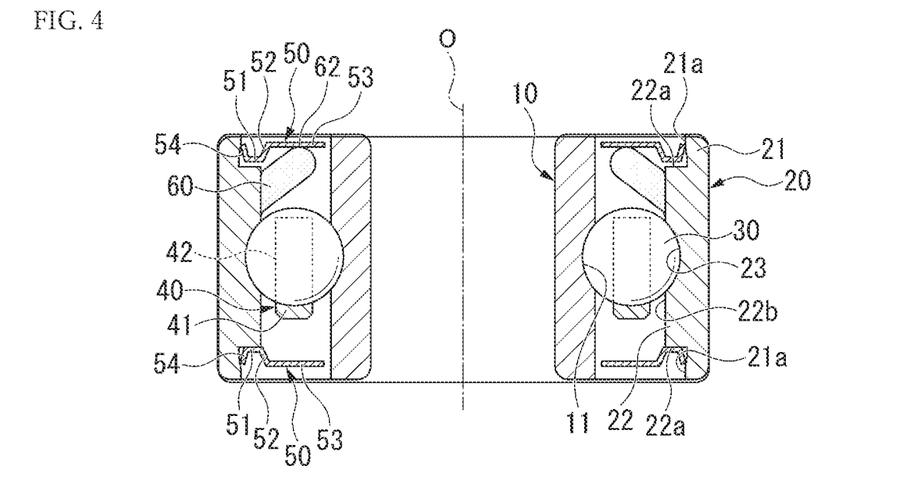
FIG. 4 is a longitudinal cross-sectional view of the rolling bearing illustrating the method for applying grease according to the first embodiment.

FIGS. 3 and 4 are longitudinal cross-sectional views of the rolling bearing illustrating a method for applying the grease according to the first embodiment.

As shown in FIG. 3, the application step is performed in a state in which the seal member 50 is not attached to the outer ring 20. That is, the grease is applied in a state in which the annular space between the inner ring 10 and the outer ring 20 is opened in the axial direction and the rolling elements 30 and the cage 40 are exposed. In the application step, the grease is discharged from a nozzle A while the nozzle A is rotated around the common axis O to the outer ring 20. At this time, a direction of the nozzle A is adjusted such that the grease is discharged outward in the radial direction and inward in the axial direction from the nozzle A. Further, the position of the nozzle A is adjusted such that the discharged grease is in contact with a predetermined position of the inner peripheral surface 22b of the protruding portion 22 of the outer ring 20 and the grease is not in contact with the rolling elements 30 and the cage 40. Since the grease is discharged while the nozzle A is rotated with respect to the outer ring 20, the grease 60 applied to the outer ring 20 extends in a circumferential shape or an arc shape. Further, the grease 60 is applied in a manner of protruding outward in the axial direction and inward in the radial direction from a contact portion with the outer ring 20 according to a discharge direction from the nozzle A. An end surface of the applied grease 60 on an outer side in the axial direction is formed in a convex shape bulging outward in the axial direction.

Next, the sealing step is performed. As shown in FIG. 4, in the sealing step, the seal member 50 is brought close to the outer ring 20 from an outer side in the axial direction to mount the seal member 50 on the outer ring 20. In a process of displacing the seal member 50 inward in the axial direction, before the pedestal portion 51 comes into contact with the end surface 22a of the protruding portion 22 of the outer ring 20, the flat surface portion 53 of the seal member 50 is first brought into contact with the end edge of the entire grease 60 on an outer side in the axial direction (contact step). At this time, the grease 60 is brought into contact with a radially intermediate portion of the flat surface portion 53. The radially intermediate portion may be located on an inner side in the radial direction with respect to an outer peripheral edge of the flat surface portion 53 and on an outer side in the radial direction with respect to an inner peripheral edge of the flat surface portion 53. Thereafter, the pedestal portion 51 is brought into contact with the end surface 22a of the protruding portion 22 of the outer ring 20 from an outer side in the axial direction by further bringing the seal member 50 close to the outer ring 20 (mounting step). At this time, the grease 60 is pressed inward in the axial direction by the flat surface portion 53 of the seal member 50. Accordingly, the grease 60 spreads in the radial direction by being pressed by the flat surface portion 53, so that the seal member contact portion 62 of the grease 60 is formed.

As described above, the rolling bearing 1 is formed. In the application step according to the present embodiment, the grease is applied while the nozzle A is rotated to the outer ring 20, but the grease may be discharged from a nozzle having a discharge hole extending in the circumferential direction, and the grease may be collectively applied in a circumferential shape or an arc shape.

As described above, the grease 60 of the rolling bearing 1 according to the present embodiment includes the outer ring contact portion 61 in contact with the inner peripheral surface 22b of the protruding portion 22 of the outer ring 20, and the seal member contact portion 62 in contact with the flat surface portion 53 of the seal member 50 on an outer side in the axial direction and an inner side in the radial direction with respect to the outer ring contact portion 61. An area of the seal member contact portion 62 is larger than a contact area between the grease 60 and the extending portion 52 as well as the pedestal portion 51 of the seal member 50. According to this configuration, when the seal member 50 is mounted after the grease 60 is applied to a predetermined location, it is possible to provide a room for the grease 60 pressed inward in the axial direction by the flat surface portion 53 of the seal member 50 to spread in the radial direction toward the extending portion 52 and the pedestal portion 51. Therefore, it is possible to prevent the grease 60 from greatly spreading to an inner ring 10 side and a rolling element 30 side. Therefore, it is possible to easily prevent the grease 60 from coming into direct contact with the rolling elements 30 and the inner ring 10.

Further, since the seal member 50 is provided with the extending portion 52 between the flat surface portion 53 and the pedestal portion 51, as compared with a configuration in which a flat surface portion extends inward in the radial direction from a pedestal portion, the grease 60 can be disposed at a position further separated from the rolling elements 30. Therefore, an amount of the grease 60 can be increased.

As described above, it is possible to provide the rolling bearing 1 that can both ensure durability and reduce rotational resistance.

The method for manufacturing the rolling bearing 1 according to the present embodiment includes: the application step of bringing the grease 60 into contact with the outer ring 20, and applying the grease 60 such that the grease protrudes outward in the axial direction and inward in the radial direction from the contact portion with the outer ring 20; the contact step of bringing the seal member 50 close to the outer ring 20 from an outer side in the axial direction, and bringing the flat surface portion 53 into contact with the end edge of the grease 60 on an outer side in the axial direction; and the mounting step of, after the contact step, bringing the seal member 50 close to the outer ring 20, bringing the pedestal portion 51 into contact with the outer ring 20 from an outer side in the axial direction, and pressing the grease 60 inward in the axial direction by the flat surface portion 53. According to this manufacturing method, since the flat surface portion 53 of the seal member 50 is in contact with the end edge of the grease 60 on an outer side in the axial direction in the contact step, in the process of pressing the grease 60 inward in the axial direction by the flat surface portion 53 in the mounting step, it is possible to provide the room for the grease 60 to spread in the radial direction toward the extending portion 52 and the pedestal portion 51 of the seal member 50. Therefore, it is possible to prevent the grease 60 from greatly spreading to the inner ring 10 side and the rolling element 30 side. Therefore, it is possible to easily prevent the grease 60 from coming into direct contact with the rolling elements 30 and the inner ring 10.

Further, since the seal member 50 is provided with the extending portion 52 between the flat surface portion 53 and the pedestal portion 51, as compared with a configuration in which a flat surface portion extends inward in the radial direction from a pedestal portion, the grease 60 is unlikely to be pressed toward the rolling element 30 side. Therefore, since the grease 60 can be disposed in advance at a position closer to the rolling elements 30, the amount of the grease 60 can be increased.

As described above, it is possible to manufacture the rolling bearing 1 that can both ensure the durability and reduce the rotational resistance.

The seal member contact portion 62 includes a center position of the grease 60 in the radial direction in a plan view. According to this configuration, when the seal member 50 is mounted, the grease 60 spreads in the radial direction by being pressed by the flat surface portion 53. As a result, since the seal member contact portion 62 includes the center position of the grease 60 in the radial direction in a plan view, it is possible to prevent the grease 60 from greatly spreading inward in the axial direction toward the rolling elements 30. Therefore, it is possible to easily prevent the grease 60 from being in direct contact with the rolling elements 30.

The grease 60 is not in contact with the extending portion 52. According to this configuration, when the seal member 50 is mounted, it is possible to provide a larger room for the grease 60 pressed inward in the axial direction by the flat surface portion 53 of the seal member 50 to spread toward the extending portion 52 in the radial direction. Therefore, it is possible to prevent the grease 60 from greatly spreading to the inner ring 10 side and the rolling element 30 side. Therefore, it is possible to easily prevent the grease 60 from coming into direct contact with the rolling elements 30 and the inner ring 10.

The outer ring contact portion 61 is provided at an interval in the axial direction from the contact portion between the outer ring 20 and the pedestal portion 51. According to this configuration, it is possible to prevent the grease 60 from coming into contact with the contact portion between the outer ring 20 and the pedestal portion 51. Accordingly, it is possible to prevent the grease 60 from leaking to an outside of the seal member 50 through the contact portion between the outer ring 20 and the pedestal portion 51 due to a capillary phenomenon.

The grease 60 is not in contact with the pedestal portion 51. According to this configuration, it is possible to prevent the grease 60 from coming into contact with the contact portion between the outer ring 20 and the pedestal portion 51. Accordingly, it is possible to prevent the grease 60 from leaking to the outside of the seal member 50 through the contact portion between the outer ring 20 and the pedestal portion 51 due to the capillary phenomenon.

According to the rotating device 2 in the present embodiment, since the rolling bearing 1 that both ensures the durability and reduces the rotational resistance is provided, it is possible to achieve a long life of the rotating device 2 and power-saving of the rotating device 2 because of the reduction in the rotational resistance of the shaft 3 with respect to the housing 4.

In the above embodiment, the pedestal portion 51 of the seal member 50 protrudes inward in the radial direction from the end surface 22a of the protruding portion 22 of the outer ring 20 in a plan view, but it is desirable that the pedestal portion does not protrude inward in the radial direction with respect to the end surface 22a of the protruding portion 22 in a plan view. According to this configuration, even if the outer ring contact portion 61 of the grease 60 spreads outward in the axial direction and climbs over the inner peripheral edge of the end surface 22a, it is possible to prevent the grease 60 from adhering to the pedestal portion. Therefore, it is possible to prevent the grease 60 from coming into contact with the contact portion between the outer ring 20 and the pedestal portion 51. Accordingly, it is possible to prevent the grease 60 from leaking to the outside of the seal member 50 through the contact portion between the outer ring 20 and the pedestal portion 51 due to the capillary phenomenon.

Second Embodiment

Next, a second embodiment will be described with reference to FIG. 5. The second embodiment is different from the first embodiment in that the rolling bearing 1 includes grease 160 instead of the grease 60 according to the first embodiment. Configurations other than those described below are similar to those according to the first embodiment.

Figure 5:
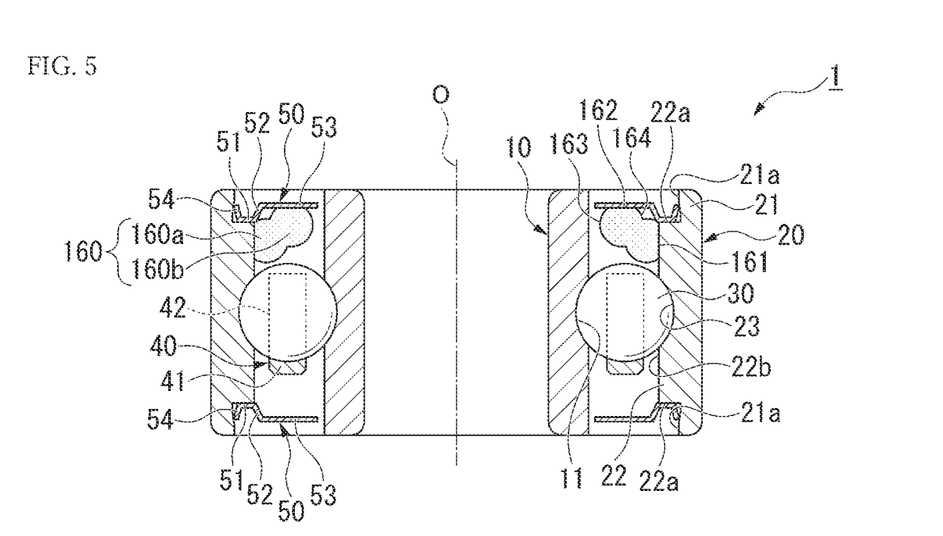
FIG. 5 is a longitudinal cross-sectional view of a rolling bearing according to a second embodiment.

FIG. 5 is a longitudinal cross-sectional view of the rolling bearing 1 according to the second embodiment.

As shown in FIG. 5, the grease 160 includes a first annular portion 160a in contact with the outer ring 20, and a second annular portion 160b that is continuous with the first annular portion 160a and that is in contact with the seal member 50. The first annular portion 160a and the second annular portion 160b are formed by applying the grease twice. The first annular portion 160a and the second annular portion 160b extend in a circumferential shape around the common axis O. However, at least either one of the first annular portion 160a and the second annular portion 160b may extend around the common axis O by less than 360°.

The first annular portion 160a includes an outer ring contact portion 161 (raceway ring contact portion) in contact with the inner peripheral surface 22b of the protruding portion 22 of the outer ring 20. The outer ring contact portion 161 extends in the circumferential direction over an entire length of the grease 160. The outer ring contact portion 161 has a width in the axial direction over the entire circumferential direction. The outer ring contact portion 161 is in contact with a location, of the inner peripheral surface 22b of the protruding portion 22, at an interval in the axial direction from the outer ring raceway surface 23. The outer ring contact portion 161 is in contact with a location, of the inner peripheral surface 22b of the protruding portion 22, at an interval in the axial direction from an inner peripheral edge of the end surface 22a on an upper side. That is, the outer ring contact portion 161 is provided at an interval in the axial direction from a contact portion between the outer ring 20 and the pedestal portion 51 of the seal member 50.

The second annular portion 160b extends in a circumferential shape around the common axis O. The second annular portion 160b is disposed on a side opposite to the outer ring 20 in the radial direction (that is, on an inner side in the radial direction) with respect to the first annular portion 160a. Specifically, in a plan view, an outer peripheral edge of the second annular portion 160b is located on an inner side in the radial direction with respect to an outer peripheral edge of the first annular portion 160a, and an inner peripheral edge of the second annular portion 160b is located on an inner side in the radial direction with respect to an inner peripheral edge of the first annular portion 160a. The second annular portion 160b is continuous with and integrated with the first annular portion 160a on an outer side in the axial direction. The second annular portion 160b is continuous over an entire periphery of the first annular portion 160a. The second annular portion 160b includes a seal member contact portion 162 that is in contact with the flat surface portion 53 of the seal member 50 on an outer side in the axial direction and an inner side in the radial direction with respect to the outer ring contact portion 161. The seal member contact portion 162 has a width in the radial direction over the entire circumferential direction. The seal member contact portion 162 is in contact with the flat surface portion 53 at a location at an interval in the radial direction from a connection portion between the extending portion 52 and the flat surface portion 53 of the seal member 50.

The grease 160 extends outward in the axial direction and inward in the radial direction from the outer ring contact portion 161 toward the seal member contact portion 162. The grease 160 includes an inner surface 163 and an outer surface 164.

The inner surface 163 connects an end edge of the outer ring contact portion 161 on an inner side in the axial direction and an end edge of the seal member contact portion 162 on an inner side in the radial direction. The inner surface 163 faces an outer peripheral surface of the inner ring 10 and the rolling elements 30. An upper end portion of the inner surface 163 extends inward in the axial direction and inward in the radial direction from an end edge of the seal member contact portion 162 on an inner side in the radial direction. The inner surface 163 is separated from the inner ring 10, the rolling elements 30, and the cage 40. Accordingly, the grease 160 is not in contact with the inner ring 10, the rolling elements 30, and the cage 40.

The outer surface 164 connects an end edge of the outer ring contact portion 161 on an outer side in the axial direction and an end edge of the seal member contact portion 162 on an outer side in the radial direction. The outer surface 164 faces the inner peripheral surface 22b of the protruding portion 22 of the outer ring 20 and the seal member 50. An upper end portion of the outer surface 164 extends inward in the axial direction and outward in the radial direction from an end edge of the seal member contact portion 162 on an outer side in the radial direction. The outer surface 164 is separated from the pedestal portion 51 and the extending portion 52 of the seal member 50. Accordingly, the grease 160 is not in contact with the pedestal portion 51 and the extending portion 52 of the seal member 50, which are located closer to an outer ring 20 side than is the flat surface portion 53 of the seal member 50.

The grease 160 disposed as described above is formed such that a cross-sectional area orthogonal to the common axis O gradually increases from an end portion on an outer side in the axial direction toward an inner side in the axial direction. In the present embodiment, the grease 160 is formed such that a cross-sectional area orthogonal to the common axis O gradually increases from the end portion on an outer side in the axial direction toward an inner side in the axial direction at a portion corresponding to an upper portion of the second annular portion 160b.

Even in the rolling bearing 1 according to the present embodiment configured as described above, operation and an effect similar to those according to the first embodiment can be achieved.

The present invention is not limited to the embodiments described above with reference to the drawings, and various modifications are conceivable within a technical scope thereof.

For example, in the above embodiment, the inner ring 10 is provided as a rotating ring, and the outer ring 20 is provided as a fixed ring. The greases 60 and 160 are in contact with the outer ring 20 that is the fixed ring. However, a raceway ring with which the grease is in contact may not be a fixed ring. That is, the inner ring may be provided as a fixed ring, the outer ring may be provided as a rotating ring, and the grease may be in contact with the inner ring that is the fixed ring. Further, the inner ring may be provided as a fixed ring, the outer ring may be provided as a rotating ring, and the grease may be in contact with the outer ring that is the rotating ring.

In the above embodiments, the greases 60 and 160 are not in contact with the pedestal portion 51 and the extending portion 52 of the seal member 50, and the present invention is not limited to the configuration. The grease may be in contact with at least either one of the pedestal portion 51 and the extending portion 52 of the seal member 50, and an area of the seal member contact portion may be larger than a contact area between the grease and the extending portion 52 as well as the pedestal portion 51.

In the above embodiments, the greases 60 and 160 are not in contact with the inner ring 10, the rolling elements 30, and the cage 40, and the present invention is not limited to the configuration. As described above, in the above embodiments, when the seal member 50 is mounted, it is possible to prevent the grease from greatly spreading to the inner ring 10 side and the rolling element 30 side. Therefore, even if the grease is in contact with at least any one of the inner ring 10, the rolling elements 30, and the cage 40, the contact portion can be made sufficiently small as compared with a related-art structure, so that an effect of reducing the rotational resistance can be attained.

An application form of the grease is not limited to the above embodiments. For example, in the second embodiment, the first annular portion 160a and the second annular portion 160b extend in the circumferential shape, and the present invention is not limited to the configuration. At least either one of the first annular portion and the second annular portion may include particles arranged in a dot shape over an entire periphery. In this case, a plurality of particles aligned in the circumferential direction may be integrated, or may be separated from one another.

In the above embodiments, the fan motor is exemplified as the rotating device, and the rotating device is not limited thereto. For example, the present invention may be applied to a dental handpiece, a spindle motor of a hard disk drive, and the like as the rotating device.

Further, it is possible to appropriately replace constituent elements in the above embodiments with well-known constituent elements without departing from the gist of the present invention.

What is claimed is:
1. A rolling bearing comprising:
an inner ring and an outer ring arranged coaxially with each other;
a rolling element disposed between the inner ring and the outer ring;
a seal member that is mounted on one raceway ring of the inner ring and the outer ring and that covers a space between the inner ring and the outer ring from an outer side in an axial direction; and grease disposed between the rolling element and the seal member, wherein the seal member comprises:
- an annular pedestal portion in contact with the one raceway ring from an outer side in the axial direction,
- an extending portion that extends axially outward from a peripheral edge on the raceway ring side of the pedestal portion; and
- a flat surface portion that extends along a radial direction from an end edge of the extending portion on an outer side in the axial direction toward the other raceway ring, wherein the grease comprises:
- a raceway ring contact portion in contact with a peripheral surface of the one raceway ring, the peripheral surface facing the other raceway ring, and
- a seal member contact portion in contact with the flat surface portion on an axially inner side of the flat surface portion and on the other raceway ring side with respect to the raceway ring contact portion, wherein an area of the seal member contact portion is larger than a combined contact area comprising a contact area between the grease and the extending portion as well as a contact area between the grease and the pedestal portion of the seal member, and wherein the grease is not in contact with the extending portion.

2. The rolling bearing according to claim 1, wherein the seal member contact portion comprises a center position of the grease in the radial direction when viewed in the longitudinal cross-section.

3. The rolling bearing according to claim 1, wherein the raceway ring contact portion is provided at an interval in the axial direction from a contact portion between the one raceway ring and the pedestal portion.

4. The rolling bearing according to claim 1, wherein the grease is not in contact with the pedestal portion.

5. The rolling bearing according to claim 1, wherein the one raceway ring comprises a protruding portion that protrudes toward the other raceway ring side and on which a raceway surface is formed, the protruding portion comprises an end surface that faces an outer side in the axial direction, that is connected to the peripheral surface at a peripheral edge on the outer raceway ring side, and that is in contact with the pedestal portion, and the pedestal portion does not protrude toward the other raceway ring side with respect to the end surface when viewed in the longitudinal cross-section.

6. A rotating device comprising:
- a rotatably disposed rotating body;
- a support body configured to rotatably support the rotating body; and
- the rolling bearing according to claim 1 interposed between the rotating body and the support body.

7. A method for manufacturing the rolling bearing of claim 1, the method comprising:
- bringing the grease into contact with the one raceway ring, and applying the grease such that the grease protrudes outward in the axial direction and toward the other raceway ring side from a contact portion with the one raceway ring;
- bringing the seal member close to the one raceway ring from an outer side in the axial direction and bringing the flat surface portion into contact with an end edge of the grease on an outer side in the axial direction; and
- bringing the seal member close to the one raceway ring, bringing the pedestal portion into contact with the one raceway ring from an outer side in the axial direction, and pressing the grease inward in the axial direction by the flat surface portion.

* * * * *